United States Patent [19]

Lampe

[11] 4,341,842
[45] Jul. 27, 1982

[54] METHOD OF COATING AUTOMOTIVE PARTS WITH SILICONE COMPOSITIONS

[75] Inventor: Warren R. Lampe, Ballston Lake, N.Y.

[73] Assignee: General Electric Company, Waterford, N.Y.

[21] Appl. No.: 164,611

[22] Filed: Jun. 30, 1980

[51] Int. Cl.³ ............................................. B32B 15/08
[52] U.S. Cl. ................................. 428/450; 181/244; 181/245; 138/145; 138/DIG. 6; 427/230; 427/231; 427/234; 427/233; 427/387; 427/388.2; 427/409; 528/901; 524/785; 524/789; 524/791; 524/837; 524/723; 524/725; 524/714; 524/772; 524/773; 524/780; 524/783; 524/784
[58] Field of Search .................. 427/387, 388.1, 388.2, 427/409; 428/447, 450; 528/901; 260/37 SB; 181/227, 228, 244, 245, 246; 138/DIG. 6, 145; 60/320

[56] References Cited

U.S. PATENT DOCUMENTS

| | | | |
|---|---|---|---|
| 3,678,003 | 7/1972 | Kaiser et al. | 528/901 X |
| 3,714,109 | 1/1973 | Matherly et al. | 528/901 X |
| 3,888,815 | 6/1975 | Bessmer et al. | 260/37 SB |

*Primary Examiner*—John D. Smith
*Assistant Examiner*—Thurman K. Page
*Attorney, Agent, or Firm*—E. Philip Koltos

[57] ABSTRACT

A method of coating an automotive part with a room temperature vulcanizable silicone rubber composition comprising applying to the automotive part a thin layer of a composition comprising a silanol end-stopped polysiloxane polymer, an alkyl silicate as the cross-linking agent and as the catalyst a metal salt of a carboxylic acid. The automotive part can be a tail pipe resonator or a muffler. Such composition, which is a two-component or two package room-temperature vulcanizable silicone rubber composition can also be used to coat the underside of a car to protect it from corrosion.

39 Claims, No Drawings

METHOD OF COATING AUTOMOTIVE PARTS WITH SILICONE COMPOSITIONS

BACKGROUND OF THE INVENTION

The present invention relates to a two component room temperature vulcanizable silicone rubber composition and more particularly the present invention relates to two component or two package room temperature vulcanizable silicone rubber compositions for the coating of automotive parts to protect them from corrosion.

Two component room temperature vulcanizable silicone rubber compositions are well-known. Generally such compositions comprise a base silanol end-stopped diorganopolysiloxane polymer having a viscosity of anywhere from 500 to 500,000 centipoise at 25° C.; an alkyl silicate or partial hydrolysis product of an alkyl silicate as a cross-linking agent and a metal salt of a carboxylic acid with the metal ranging from lead to mangense in the Periodic Table as the curing catalyst. There may be also incorporated into such composition reinforcing and extending fillers. Examples of reinforcing fillers are, for instance, fumed silica, precipitated silica. Examples of extending fillers are, for instance, iron oxide, zinc oxide, diatomaceous earth, ground silica and so forth. Other agents that may be added to the composition are anti-settling agents such as hydrogenated castor oil and self-bonding additives. An example of a self-bonding additive for a two-component room temperature vulcanizable silicone rubber composition is an amino functional silane such as gamma amino propyl triethoxy silane. An example of such a self-bonding additive is, for instance, to be found in the U.S. Patent of Warren Lampe et al, U.S. Pat. No. 3,888,815 which is hereby incorporated by reference into the present case.

In preparing the composition, normally the silanol polysiloxane is packaged separately from the cross-linking agent and the metal salt of a carboxylic acid is usually packaged with the cross-linking agent. The filler and the other ingredients are usually incorporated into the silanol end-stopped polymer. Accordingly, the silanol polymer with the filler and other ingredients is usually packaged in a separate package and the alkyl silicate cross-linking agent and the metal salt of a carboxylic acid usually packaged in a second package. There is formed a two-package or two component room temperature vulcanizable silicone rubber composition, (hereinafter referred to as an RTV silicone composition). When it is desired to cure the composition, the two components are simply mixed together and allowed to cure either in the presence or absence of atmospheric moisture to a silicone elastomer. Normally a tack-free coat will form from 20 to 60 minutes after the two components are mixed and applied and the composition will be essentially cured in 24 to 72 hours after mixing. To hasten the cure of the composition, and especially to obtain deep section cure, there may be incorporated into the composition small amounts of water, in either of the two packages. There have been developed mixing nozzles for applying the two components or mixing the two components simultaneously and spraying them on to various surfaces, for instance, on roofs. There are also certain of these two component room temperature vulcanizable silicone rubber compositions, which are dissolved in organic hydrocarbon solvents such as cyclohexane, cycloheptane, cyclooctane, mineral spirits, toluene, that is, both components are dissolved in solvents and applied by a spray mixing nozzle on surfaces so as to form a thin coating. As soon as the composition is sprayed, the solvent gradually evaporates away and then the composition appears to form a thin layer of silicone elastomer at room temperature. The two components can be applied after mixing by spraying, brushing or dipping. Irrespective of how the two compositions are mixed and applied, it will cure to a silicone elastomer and depending on the amount of filler and the type of filler and other ingredients, it will have a desirable tensile strength and even to some extent be abrasion resistant. It will also have an elastomeric properties of a silicone rubber and have a certain amount of elongation, a good tear, and a good hardness. Such compositions have been utilized traditionally to form, for instance, silicone molds, from which plastic parts are fabricated. This is because of high tear strength of the silicone elastomer and its anti-adhesion properties. These compositions because of their resistance to moisture in the cured state and the elements as well as being resistant to degradation from ultraviolet light, have been utilized for encapsulated of potting composition. They also have found wide use as stated before for roof compositions.

At one time they were utilized as sidewalk or traffic toppings; however, the composition did not have a sufficient abrasion resistance at that time to be suitable as a traffic topping. Accordingly, such silicone compositions have wide use where an RTV cure is desirable and where physical properties have resistance to the elements and moisture, good electrical properties as well as anti-stick properties or good high temperature properties commesurate with good low temperature properties are desired. It should also be appreciated that the composition is relatively cheap to prepare as compared with most RTV silicone rubber compositions. Such compositions were utilized to fabricate gaskets and oil resistance parts in automobiles. However, the compositions were never properly evaluated as far as is known to the reader for their corrosion resistant properties.

Recently, because of energy restrictions, cars have been required to have greater and greater gas mileage. To accomplish this purpose, automobiles have been made smaller and of lighter weight. In particular, parts in the automobile have been fabricated with lighter gauge metal and of smaller total weight. It was desired as the weight of automobiles and the weight of metal parts in the automobile have been decreased to thus increase the gas consumption of the automobile. Accordingly, it has become necessary to find means to protect the automobile from corrosion for as long a period of time as prior heavier metal parts accomplished. At the same time, it was desirable to utilize a coating which would be relatively inexpensive. It should be noted by relatively inexpensive it is meant that in the past RTV compositions were too expensive to utilize as coatings for the parts of automobiles. However, as the cost of the overall automobile increased and as the premium that the consumer paid for gasoline increased, many more materials have become competitively desirable to utilize as protective coatings for the lighter gauge metal parts that are placed in the present day automobile. Accordingly, various types of coatings have been attempted for lighter gauge metal parts of automobiles such as the coating of the underside of the automobile to protect it from corrosion; the coating of tailpipes to protect them from corrosion; and the coating of mufflers and resonators to protect them from corrosion.

However, while some of these coatings which were the most desirable in that they protected the underlying metal from corrosion were light in weight, thus fulfilling the requirements of increasing the gas economy of the present day automobiles, nevertheless, they had one disadvantage, they were hard brittle coatings and when they were hit by a stone, they would break or chip off, allowing the undercoating metal to be exposed to the corrosive elements. Accordingly, it was highly desirable to find a competitive corrosion protecting coating which would be competitively priced with other coatings and yet be more durable and tenacious as far as adhering and protecting the metal parts from corrosion.

Accordingly, it is one object of the present invention to provide for a two component RTV composition for coating the underside of automobiles, for coating tailpipes and for coating mufflers so as to protect them from corrosion.

It is an additional object of the present invention to provide for a two component RTV silicone composition which can be applied as a thin layer to the underside of an vehicle to protect it from corrosion and yet at the same time not chip off when hit by a hard stone.

It is a still additional object of the present invention to provide for a two component RTV silicone composition coating for mufflers and tailpipes such that it will protect the mufflers and tailpipes from corrosion and yet the coating will be in an elastomeric form which will not be brittle and chip off when hit by a sharp object.

It is still yet an additional object of the present invention to provide a method for coating the undersides of vehicles, for coating mufflers, and for coating tailpipes with a two-component RTV silicone composition to protect the tailpipes, the underside of vehicles from corrosion. These and other objects of the present invention are accomplished by means of the disclosures set forth hereinbelow.

SUMMARY OF THE INVENTION

In accordance with the objects, there is provided by the present invention, a method of coating an automotive part with a room temperature vulcanizable silicone rubber composition comprising (1) applying to the automotive parts a thin layer of a two component room temperature vulcanizable silicone rubber composition having (A) 100 parts of a silanol end-stopped diorganopolysiloxane polymer with a viscosity varying from 100 to 500,000 centipoise at 25° C. where the organo groups are monovalent hydrocarbon radicals; (B) from 0.1 to 15 parts by weight of alkyl silicate of formula,

$$R_aSi(OR^1)_{4-a} \qquad (1)$$

and partial hydrolysis products of the silicate where R and $R^1$ are monovalent hydrocarbon radicals, a is 0 or 1 and (C) from 0.01 to 5 parts by weight of a metal salt of a carboxylic acid with the metal varying from lead/to manganese in the Periodic Table and (2) allowing the layer of silicone rubber composition to cure at room temperature to a silicone elastomer.

Such a method can be utilized advantageously to coat the underside of vehicles, in particularly, automobiles to protect them from corrosion and also the coatings can be utilized to coat tail pipes and mufflers, inside and out, to protect them from corrosion. This advantageously allows the utilization of lower gauge metal for the production of these automotive parts and for the underside of automobiles, lowering the weight of the automobile and thus increasing the gasoline mileage of the motor as is currently desired. It should be noted that the present invention relates solely to the use of two component or two package condensation curing RTV silicone rubber compositions for the production of such coatings. The invention of the instant case is strictly limited to the utilization of such two component or two package RTV silicone compositions for the production of the foregoing coatings as disclosed above and as will be disclosed in more detail herein and below.

DESCRIPTION OF THE PREFERRED EMBODIMENT

The present specific invention relates to the coating of automobile parts specifically automobile mufflers, automobile tail pipes, with a two-component room temperature vulcanizable silicone rubber composition. The RTV composition is of condensation type rather than addition cured. There can also be coated the underside of the car with the two component or two part RTV composition of the present invention so as to prevent the underside of a car from rusting or being corroded by salts, the elements, and other ingredients to be found on the highways, particularly in the highways in the northern climates. Accordingly, normally, in the clearing away of highways from ice and snow during the winter months in Northern climates, usually salt is dumped on the road. This forms a saline mixture with the water and snow which is a very corrosive mixture which corrodes and eats away the metal on the underside of most automobiles. This is particularly evident in modern day automobiles, where the automobiles are made of lighter gauge metal. Accordingly, it was found by the coating of automobiles with a condensation curing two component RTV compositions of the present invention that such corrosion and eating of the metal could be prevented.

Such organic coatings cannot be used directly on the automobile at temperatures above 500° F. since the coating is not firmly stable above that temperature range for a continuous period. The coating of the instant case are able to operate at temperatures up to 500° F. continuously if there is utilized thermal fillers in the composition such as iron oxide. If such thermal fillers are not utilized, then the coating will operate continuously at temperatures up to 400° F. Accordingly, depending on what temperatures it is desired to operate continuously will depend on how far the coating is applied in the underside of the car to protect the car from corrosion. However, such coating can easily be applied to coat mufflers resonators and tail pipes to protect them from corrosion and specifically, to coat that part of the tailpipe which is at least 1 to 2 feet beyond the engine since to that part of the tail pipe which is too close to the engine and which is continuously at a temperature above 500° the coating will probably degrade at the high temperatures, the portion of the tail pipe which is at temperatures of 500° F. or below can be coated with the coatings of the instant case with advantage.

The basic constituent of the coating of the instant case is 100 parts by weight of a silanol end-stopped diorganopolysiloxane polymer having a viscosity varying from 100 to 500,000 centipoise at 25° C. and more preferably having a viscosity varying from 100 to 200,000 centipoise at 25° C. where the organo group is a monovalent hydrocarbon radical. The organo group can be, for example, selected from alkyl radicals of 1 to 8 carbon atoms as methyl ethyl propyl etc., cycloalkyl radicals such as cyclohexyl, cycloheptyl, cyclooctyl etc.; mononuclear aryl radicals such as pheynl, methylphenyl, etc., alkenyl radicals such as vinyl, allyl, etc., and haloalkyl radicals such as 3,3,3-trifluoropropyl. Most preferably, the alkyl radical is selected from alkyl radicals of 1 to 8 carbon atoms and phenyl and vinyl.

Preferably, silanol end-stopped diorganopolysiloxane has the formula,

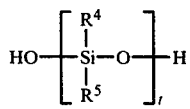
(2)

where $R^4$ and $R^5$ are monovalent hydrocarbon radicals and t varies such that the diorganopolysiloxane polymer has generally a viscosity varying from 100 to 500,000 centipoise at 25° C. and more preferably has a viscosity varying from 100 to 200,000 centipoise at 25° C. The $R^4$ and $R^5$ radicals can be any of the radicals disclosed above for the organo groups of the silanol end-stopped diorganopolysiloxane polymer.

The silanol end-stopped diorganopolysiloxane polymers are produced by equilibrating the appropriate cyclotetrasiloxane with low molecular weight silanol end-stopped diorganopolysiloxane polymers having a viscosity varying from 1 to 1,000 centipoise at 25° C. in the presence of alkali metal hydroxide catalyst such as potassium hydroxide or in the presence of the acid catalyst such as toluene sulfonic acid or acid treated clay. An example of an acid treated clay is the acid treated clay sold under the name of Filtrol, by Filtrol Corporation of Los Angelos, Calif. After the reaction mixture has proceeded to equilibration, that is the appropriate viscosity of the polysiloxane polymer has obtained at a maximum yield which is about 85%, the reaction mixture is cooled and the basic catalyst is neutralized with an acid such as phosphoric caid or a silyl phosphate. In the case of an acidic catalyst, it is neutralized with a base.

The procedure for obtaining such polymers is well known to the art and the above is just a summary description thereof. Per 100 parts of a silanol end-stopped diorganopolysiloxane base polymer, specifically that of Formula (2) above, there may be utilized from 0.1 to 15 parts by weight of an alkyl silicate of Formula (1) as disclosed previously and partial hydrolysis products of a silicate. In Formula (1) is is preferred that a is equal to 0. The most preferred condensation agent or cross-linking agent is tetraethylorthosilicate and more specifically a partial hydrolysis product of tetraethylorthosilicate. Such silicates are produced by reacting an appropriate alcohol with the appropriate chlorosilane so as to obtain the desired silicate product. It has been noted above in Formula (1) that a can be 1 but is preferably equal to 0. Finally there is utilized as a catalyst from 0.01 to 5 parts by weight of a metal salt of a carboxylic acid with metal varying from lead to manganese in the Periodic Table. It is preferable that the salt used is a tin salt such as a dibutyl tin oxide, dibutyl tin neodecante, dibutyl tin dilaurate. Accordingly, the carboxylic acid radicals that may be utilized is the metal salt of the carboxylic acid, which may vary anywhere from 1 to 20 carbon atoms.

Suitable acid radicals are the recinate, linolcate, stearate, oleate, as well as the lower radicals such as acetate butyrate, octoate and others which form the necessary metallic salts. Preferably, metallic salts of lauric acid have been found to be especially effective. The metal ion of the metal salt is one selected from the class consisting of lead, tin, ziconium, antimony, iron, cadmium, barium, calcium, titanium, bismuth and manganese. Thus, examples of suitable metallic salt catalysts are tin naphthenate, lead octoate, tin octoate, iron stearate, tin oleate, antimony octoate, tin butyrate, basic dibutyl tin laurate and dibutyl tin dilaurate. The tin and lead salts are preferred since they are usually soluble in the diorganopolysiloxanes of formulas (4) and (5) and since they have enhanced catalytic activity in combination with the alkyl silicate. It is important to note that other compounds which would be expected to exercise good catalytic activity in the mixture of diorganopolysiloxane, filler, and alkyl silicate excercised no catalytic activity whatsoever. This class of compounds are cobalt oleate, cobalt naphthenate, manganese naphthenate, nickel naphthenate and calcium stearate.

These metal salts of a carboxylic acid are well known compounds. There may be utilized other cross-linking agents in the present composition other than alkyl silicate.

Although the preferably cross-linking agents are organosilicates, there may also be used as cross-linking agents organopolysiloxane resins having a functionality greater than 2 and preferably greater than 2.5. The organopolysiloxane resins are methylsiloxanes, or resins which contain both monomethyl and dimethyl or monophenyl units. There may also be used ethylsiloxane resins in which the ratio R"Si is 1.4 to 1 and which mixture contains 15 percent of butoxy groups or there may be used resins in which the ratio R"Si is 1.1 to 1 and which contain 10 percent of methoxy groups or there may be used methylphenylsiloxane resins containing 50 percent of monomethyl units, 25 percent of dimethyl units and 25 percent of monophenyl units.

Other suitable cross-linking agents are organohydrogenpolysiloxanes of the formula,

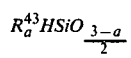

in which $R^{43}$ is an alkyl or aryl radical and a is a number less than 2, but is not zero. The organohydrogenpolysiloxane cross-linking agents have the disadvantage that during curing there is evolved hydrogen gas which can result in bubbles being trapped in the silicone rubber composition. Although the above cross-linking agents can be used in the compositions, the organosilicates of formula (1) are preferred since the processability of the composition is facilitated and the cured silicone rubber composition has better physical properties. A more detailed description of these other cross-linking agent is to be found in Nitzsche et al, U.S. Pat. No. 3,127,363.

However, it is preferred on the composition to utilize an alkyl silicate and specifically an ethyl silicate as a cross-linking agent and specifically an orthoalkyl silicate as a cross-linking agent. More preferably there is utilized a partial hydrolysis product of an orthoalkyl silicate and more particularly the partial hydrolysis product of an ethyl ortho silicate.

Accordingly, there are three basic ingredients that form the two component RTV composition of the instant case. Simply mixing or packaging the silanol polysiloxane composite from the alkyl silicate with the metal salt of a carboxylic acid being in either one or the other package. It is possible to store the composition in separate packages for periods of years without any deleterious effects. When it is desired to cure the composition, the two packages are simply mixed to result in a composition which cures to a silicone elastomer. By utilizing such a composition, it is possible to coat the underside of an automobile other than where high temperature detracts from utilizing the composition as disclosed previously and also to coat mufflers, both inside and out, tail pipes, inside and out, so as to prevent corrosion of the automotive parts on the underside of the automobile.

To increase the tensile strength of the cured composition and also in terms of certain fillers to increase the high temperature of the composition there may be incorporated from 5 to 350 parts of filler in the composition per 100 parts of the base silanol end-stopped diorganopolysiloxane polymer. Preferably there is utilized from 10 to 250 parts of filler and such as reinforcing or semi-reinforcing fillers and extending fillers. The reinforcing fillers have 100 to 300 square meters surface meters per gram while semi-reinforcing fillers have a surface area from 1 to 20 square meters per gram. The reinforcing fillers are added when it is desired to have a high strength silicone rubber composition. The extending fillers, specifically the iron oxide and zinc fillers are added to increase the high temperature stability of the composition while still increasing the tensile strength and also to give the composition additional anti-corrosion properties.

Illustrative of the many fillers that can be utilized are titanium dioxide, lithopone, zinc oxides, zirconium silicate, silica aerogel, iron oxide, diatomaceous earth, calcium carbonate, fumed silica, precipatated silica, glass fibers, magnesium oxide, chromic oxide, zirconium oxide, aluminum oxide, crush cores, calcium clay, carbon, graphite, cork, cotton, and synthetic fibers. There may also be used such fillers which are also treated with cyclo tetrasiloxanes, and also treated with silazanes. The advantages of treating the fillers, particularly the reinforcing fillers with such a silicone agent, is to allow them to increase the tensile strength of the composition while not increasing the uncured viscosity of the composition unduly.

In the instant compositions, it is preferred that there be utilized extending fillers such as iron oxide, zinc oxide, powdered zinc, chromic oxide, certain chromates so as to increase the high temperature stability of the composition while at the same time imparting to the composition anti-corrosion inhibiting properties. Accordingly, there may be utlized in the filler totally iron oxide, or a mixture of iron oxide and diatomaceous earth. As corrosion inhibitors in the composition, there may be utilized anywhere from generally 0.01 to 300 parts by weight and preferably 0.01 to 50 parts by weight of zinc powder and chromates or mixtures thereof. There may be as much as up to 300 parts or more such compounds based on 100 parts by weight of the silanol based polymer; however, such amounts are generally not necessary. There may be utilized as little as 0.01 to 50 parts by weight of the corrosion inhibiting compounds. Examples of chromates which are good inhibiting compounds in the instant case, are, for instance, $Zn_2CrO$ and $Ca_2V_2O_4$. There may also be utilized any other corrosion inhibiting compounds in the instant composition which are found to be advantageous.

It should be noted that the chromates and the zinc powder given above are just exemplary of a large class of compounds which may be utilized in the instant composition. It is preferred in the instant composition that there be anywhere from 0.5 to 100 parts by weight of iron oxide and also some chromate compounds so as to give the composition both thermal stability at temperatures up to 500° F. in continuous use and also to give the composition anti-corrosion properties in addition to that inherent in the silicone elastomer that is formed in the composition.

Since the composition is preferably sprayed or dipped or brushed on to the part that is to be coated, it is preferred that the composition contain an anti-settling compound or anti-caking agent for the uncured composition such as a hydrogenated castor oil such as that sold under the name Thixcin, a tradename for such hydrogenated castor oil, which is the tradename of the Baker Castor Oil Company. Preferably there is utilized from 0.01 to 1 part by weight of the anti-settling agent or anti-caking agent which is the hydrogenated castor oil. The technology has developed to the point where such two component condensation curing RTV compositions packages can be sprayed on directly to a surface utilizing a dual mixing and spray nozzle apparatus such as, for instance, manufactured and sold by Plural Component Systems Corporation. However, the two components may also be sprayed, brushed or dipped on to the automotive part after they have been first dissolved in the appropriate solvents. Thus, the two components are two different packages that may be prepared by first being dissolved in a solvent such that the composition comprises 5 to 50 percent by weight of the solution and the coating is applied on the automotive part by spraying said solution and then allowing the solvent to evaporate. The organic solvent that may be utlized for this purpose is any organic solvent which is inert to the condensation curing RTV composition. Examples of classes of organic solvents that may be utilized to dissolve the two separate packages of the two component RTV composition are, for instance, aromatic solvents, aliphatic hydrocarbon solvents, ketone solvents, ester solvents and chlorinated aliphatic hydrocarbon solvents. Examples of aromatic solvents are xylene, toluene; examples of aliphatic hydrocarbon solvents are, for instance, cyclohexane, cycloheptane; examples of ketone solvents are, for instance acetone; examples of chlorinated aliphatic hydrocarbon solvents are, for instance, trichloroethane carbon tetrachloride.

The most preferred solvents are, of course, xylene or toluene, and cyclohexane, cycloheptane, and cyclooctane. In preparing the two different packages or two different components, the two components with their fillers and other additives therein are first prepared and dissolved in the appropriate solvent or prepared by mixing each ingredient into the solvent. At any rate, irrespective of which process that is utilized, there is prepared two solutions, one of the base polymer, and one of the cross-linking agent and catalyst. When it is desired to apply the composition, the solution is simply sprayed on with a dual mixing nozzle as stated previously on to the surface to be coated. The solvents are allowed to evaporate and then the coating or a thin layer of coating cures to a silicone elastomer. It should be noted that by utilizing this method or by any other method, irrespective of whether the composition is applied in the form of a solution or not, there can be applied to coat the automotive parts or the underside of an automobile, a thin layer of an RTV composition which cures to a silicone elastomer, coating the desired part and protecting it from corrosion. Coating is preferably 1 to 50 mils thick and is more preferably 5 to 20 mils thick. However, as can be appreciated, the coating can be any thickness desired beyond the minimum of 1 mil. Since the thickness of the coating will further protect the automotive part from corrosion, one detraction from utilizing a coating that may be too thick is the expense of the RTV composition. As noted previously, the coating may be applied either directly or in the solution form by spraying, brushing or dipping or any other method that is customary in applying such compositions and is customary in coating automotive parts and undersides of automobiles. It should also be noted that while the only automotive parts disclosed above to be coated have been disclosed as being mufflers, resonators, tail pipes and the underside of an automobile or vehicle, other automotive parts may be coated to protect them from corrosion. Examples of other automotive parts that may be coated with the present composition to prevent them from corroding are as follows:

Gas tanks
Fenders
Axles
Frames
Springs
Drive Shafts

There may also be incorporated into the composition from 0.1 to 10 parts by weight per 100 parts of the base polymer of a self-bonding additive of the formula,

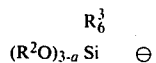

where $R^2$ and $R^3$ are monovalent hydrocarbon radicals, a varies from 0 to 2 and $\theta$ is a nitrogen-functional radical which is saturated, unsaturated or aromatic hydrocarbon residue which in addition to nitrogen functionality may be functionalyzed by a radical selected from the class consisting of amino, cyano, thion and ester, OxO and ester.

Preferably the self-bonding additive is a compound of the formula,

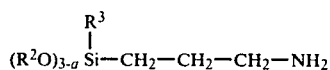

where $R^2$ and $R^3$ are as previously defined.

Most preferably the self-bonding additive will be gamma-amino propyl triethoxy silane. Examples of this amino functional silanes and other functional silanes which are useful as self-bonding additives in two-component RTV compositions in the present case are, for instance, to be found in U.S. Pat. No. 3,888,815 which is hereby incorporated by reference. For disclosures to the preparation of such self-bonding additives one is referred to that patent. Self-bonding additives may either be mixed on the base compound or into the cross-linking agent to produce a composition which will bond to most substrates without an additional primer.

However, to obtain maximum adhesion of the two part RTV coating to metals it is specifically desirable that there be utilized a silicone primer. It should be noted that the better the adherence of the coating to the metal substrate the longer will be the anti-corrosion protection. Most failures of the coatings of the instant case result from lack of adherence of the coating to the substrates, such that after a few years the bonding between the coating and metal fail and the coating simply falls off from the metal. Accordingly, preferably, there is utilized a silicone primer. An example of a primer that can be utilized is a primer in a solvent which is a reaction product of a silicone resin composed of trifunctional siloxy units and diorgano difunctional siloxy units where the organo Si ratio varies from 1.88 to 1.98 where the organo groups are alkyl radicals of 1 to 8 carbon atoms with the condensed silicate of the formula,

(3)

where $R^7$, $R^8$ are monovalent hydrocarbon radicals and b is 0 or 1 dissolved in an organic solvent.

Preferably $R^8$ and $R^7$ is an alkyl radical of 1 to 8 carbon atoms, most preferably being ethyl. The monoorgano group and the trifunctional siloxy unit in the silicone resin is most preferably methyl. Preferably, a condensed ortho silicate is reacted with the foregoing silicone resin in the presence of a metal catalyst and an iron chloride catalyst. Accordingly, in the preparation of such primer, the resin is added to a solvent which may be a mixture of solvents such as aliphatic alcohols of 1 to 8 carbon atoms and ketone solvents such as acetone. To the resulting solvent mixture there is added to the condensed alkyl orthosilicate to which there is added the iron chloride catalyst and a small amount of water such as 0.5 to 5 percent water by weight of the total composition and the composition is reacted at room temperature. There may be added to the composition a small amount of dye for the purpose of identifying the primer by sight. In this manner, a silicone primer may be prepared. In preparing the composition there is utilized from 50 to 100 parts of the silicone resin 0.1 to 10 parts of a condensed alkyl ortho silicate to 0.001 to 0.1 parts of the iron catalyst. Preferably the catalyst is ferric chloride. The ketone and aliphatic alcohol solvent mixture is utilized in anywhere from 5 to 95 percent by weight of the aliphatic alcohol and the rest of the solvent being a ketone. In the preparation indicated above there is prepared a silicone primer which is suitable for utilization with the two-part RTV compositions of the instant case for applying them and adhering them to metal, specifically to metal parts on an automobile. Any other suitable primer may be utilized with the coating of the present invention. First the metal surface to be coated is cleaned thoroughly, of old paint and old coatings. Rust is also removed. Then the surface is coated with the primer and the solvent is allowed to evaporate from the primer so that the primer may be applied by brushing, dipping, or spraying. After the solvent from the primer has evaporated, the coating may be applied again by brushing, dipping or spraying. If the coating utilizes a solvent, the solvent is then allowed to evaporate off, then there is allowed a period of anywhere from 24 to 72 hours for the coating to cure fully to a silicone elastomer. For the coating to be effective, there should be a minimum of at least 1 mil of RTV coating on the metal part as stated previously. The maximum thickness of the coating can be any thickness, the only detraction from applying too thick a coating to the metal part or underside of an vehicle is the expense of applying a too great a thickness of the RTV composition. It should also be noted that the instant invention is not limited to the silicone primer disclosed above and other suitable primer may be utilized in the instant case. Any primer which will bond effectively to the silicone composition of the instant case to metal parts can be utilized and the better the primer the more effective will be the coating. Once the coating has formed, that is bonded properly to the metal part, it will protect the metal part from corrosion that is occasioned by moisture and various parts of the elements and also from salt deposits on the road which is normally found in the winter in the northern climates. Examples below are given for the purpose of illustrating the present invention and are not given for purposes of setting limits and boundaries in the scope of the instant invention. All parts of th examples are given by weight.

EXAMPLE 1

There was prepared a two part RTV composition having 51.8 parts by weight of a dimethyl silanol terminated dimethyl polysiloxane polymer of 4,000 centipoise viscosity at 25° C., 33.7 parts by weight of red iron oxide filler, 13 parts of diatomaceous earth filler, and 1.5 parts by weight of partially hydrolyzed ethyl ortho silicate. To 100 parts of this composition there was added a catalyst of 0.3 parts by weight of dibutyltindilaurate. The composition was dissolved in 20 parts of toluene. The silicone primer that was utilized with the above RTV composition compound was a silicone resin composed of 40.9 parts by weight of a silicone resin compound of monomethyl trifunctional siloxy units and dimethyl difunctional siloxy units which is prepared as a 40 percent solid solution by weight in a toluene/butanol solution comprising 50 parts of toluene and 50 parts of butanol. To this solution there was added 2.56 parts by weight of condensed ethylsilicate 0.0125 parts of feric chloride, 30.6 parts of acetone and 25.5 parts of isopropanol. The resulting primer was applied on a clean surface of the metal before the RTV composition was applied there over. The material was used to coat an exhaust pipe. In this case, the interior and the exterior of the exhaust pipe were degreased by solvent cleaning, primed with the above silicone primer solution and subsequently coated with a solvent solution of the above RTV composition. The catalyzed mixture was applied so that a cured film thickness of about 10–30 mils was achieved. The inside and outside of the exhaust pipe were coated to prevent corrosion. The RTV was allowed to cure at 24 hours at ambient conditions and the exhaust pipe was installed on the car. This coated assembly lasted several times longer than an uncoated tailpipe on the vehicle which had a "dual exhaust" system. Previous experience indicated a tailpipe life of 18–24 months, whereas the coated tailpipe lasted three years at which time the vehicle was traded in. At that time, other than dirt accumulation, the coating was in excellent condition.

EXAMPLE 2

There was prepared an RTV Composition A comprising of 24.1 parts by weight of a silanol end-stopped dimethyl polysiloxane polymer of 3,000 centipoise viscosity to which was added 58.3 parts of ground silica into which was added further 0.29 parts of hydrogenated castor oil. To this there was added a solution containing 14.6 parts of xylene solvent 2.3 parts of titanium dioxide, 0.33 parts of carbon black and 0.11 parts of pigment. There was prepared a catalyst Composition B comprising 38.7 parts by weight of partially hydrolyzed ethyl ortho silicate, 12.5 parts of dibutyl tin dilaurate both of which were dissolved in 50 parts of weight of Mineral spirits. Accordingly, 100 parts of composition A was catalyst with 0.4 parts by weight of Composition B. In this Example, the exhaust system of a new 4-way drive vehicle was externally coated with the RTV composition, a gray two part roof coating type material, which was catalyzed with 4 wt. percent of composition B. Prior to coating the system it was wiped with mineral spirits to remove any oil/grease and then primed with the same primer as in Example 1. The catalyst coating was spray applied to the exhaust system installed on the vehicle. Complete encapsulation of the muffler on the top side probably was not achieved. The observation about 2–4 weeks of driving after the coating was applied indicated that the coating had deteriorated up to about 2 ft. from the exhaust manifold. However, from this point backward, the coating remained in excellent condition. The muffler/tailpipe lasted for 3–4 years before replacement was necessary. The above results indicated that a flexible elastomeric coating could be readily applied to an automotive exhaust system, the coating would maintain integrity in spite of road abrasion and exhibited good thermal stability at exhaust system temperatures to within 2 feet of the manifold. Red iron oxide filled RTV due to its enhanced thermal resistance is preferred as one encounters higher temperatures near the engine.

I claim:

1. A method of coating the underside of a metal automotive part with a room temperature vulcanizable silicone rubber composition comprising (1) applying to an automotive part a thin layer of a room temperature vulcanizable silicone rubber composition having (A) 100 parts of a silanol end-stopped diorganopolysiloxane polymer with a viscosity varying from 100 to 500,000 centipoise at 25° C. where the organo group is a monovalent hydrocarbon radical; (B) from 0.1 to 15 parts by weight of an alkyl silicate of the formula,

$$R_a Si(OR^1)_{4-a}$$

and partial hydrolysis products of the silicate where R and $R^1$ are monovalent hydrocarbon radicals, a is 0 or 1 and (C) from 0.01 to 5 parts by weight of an effective metal salt of a carboxylic acid and (2) allowing the layer of silicone rubber composition to cure at room temperature to a silicone elastomer.

2. The method of claim 1 wherein the automotive part is a muffler.

3. The method of claim 1 wherein the automotive part is a tailpipe.

4. The method of claim 1 wherein there is further present in the composition from 5 to 350 parts of filler.

5. A method of claim 4 wherein the filler is iron oxide.

6. The method of claim 4 wherein the filler is diatomaceous earth.

7. The method of claim 4 wherein there is further present a corrosion inhibitor at a concentration of 0.01 to 5 parts by weight selected from the class consisting of zinc powder, chromates and mixtures thereof.

8. The method of claim 7 wherein the chromates are selected from the class consisting of $Zn_2 Cr_2O_4$, and $Ca_2 CN_2O_4$ and mixtures thereof.

9. The method of claim 8 wherein there is further present from 0.01 to 1 parts by weight of anti-settling agent which is hydrogenated castor oil.

10. The method of claim 9 wherein the metal salt of a carboxylic acid is a tin salt of a carboxylic acid.

11. The method of claim 1 wherein the room temperature silicone rubber composition is first dissolved in organic solvent such that the composition comprises 5 to 50% by weight of the solution and the coating is applied by coating the automotive part of with a layer of said solution and then allowing the solvent to evaporate.

12. The method of claim 11 wherein the organic solvent is selected from the class consisting of aromatic solvents, aliphatic hydrocarbon solvents, ketone solvents, ester solvents and chlorinated aliphatic hydrocarbon solvents.

13. The method of claim 12 wherein there is present from 0.1 to 10 parts by weight of a self-bonding additive of the formula,

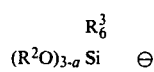
$(R^2O)_{3-a} Si \ \ominus$ where $R^2$ and $R^3$ are monovalent hydrocarbon radicals, a varies from 0 to 2 and $\theta$ is a nitrogen-functional radical which is saturated, unsaturated or aromatic hydrocarbon residue which in addition to nitrogen functionality may be functionalyzed by a radical selected from the class consisting of amino, cyano, thio, OxO, and ester.

14. The method of claim 13 wherein the self-bonding additive has the formula,

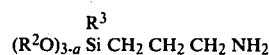
$(R^2O)_{3-a} Si \ CH_2 \ CH_2 \ CH_2 \ NH_2$ where $R^2 \ R^3$ and a is as previously defined.

15. The method of claim 1 wherein the silanol end-stopped diorganopolysiloxane has the formula,

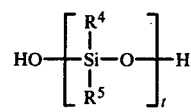

where $R^4$ and $R^5$ are monovalent hydrocarbon radicals and t varies such that the diorganopolysiloxane polymer has a viscosity varying from 100 to 500,000 centipoise at 25° C.

16. The method of claim 1 wherein before the layer of the room temperature vulcanizable silicone rubber composition is applied, there is applied to said automotive part a layer of silicone primer and solvent and then the solvent is allowed to evaporate from the primer and then there is applied the layer of the room temperature vulcanizable silicone rubber composition.

17. The method of claim 16 wherein the silicone primer composition is a reaction product of a silicone resin compound of monoorgano trifunctional siloxy units and diorgano difunctional siloxy units where the organo to Si ratio varies from 1.88 to 1.98 where the organo units are alkyl radicals of 1 to 8 carbon atoms with a condensed silicate of the formula,

$R^8_b Si(OR^7)_{3-b}$ where $R^7$, $R^8$ are monovalent hydrocarbon radicals and b is 0 to 1 dissolved in an organic solvent.

18. The method of claim 17 wherein the condensed silicate is ethyl silicate and the organic solvent is a mixture of an aliphatic alcohol and a ketone.

19. A method coating the underside of a metal vehicle part with a room temperature vulcanizable silicone rubber composition comprising (1) applying to the underside of the vehicle a thin layer of a room temperature vulcanizable silicone rubber composition having (A) 100 parts of a silanol end-stopped diorganopolysiloxane polymer with a viscosity varying from 100 to 500,000 centipoise at 25° C. where organo group is a monovalent hydrocarbon radical; (B) from 0.1 to 15 parts by weight of an alkyl silicate of the formula,

$R_aSi(OR^1)_{4-a}$ and partial hydrolysis products of the silicate where R and $R^1$ are monovalent hydrocarbon radicals, a is 0 or 1 and (C) from 0.01 to 5 parts by weight of an effective metal salt of a carboxylic acid and (2) allowing the layer of silicone rubber composition to cure at room temperature to a silicone elastomer.

20. The method of claim 19 wherein the vehicle is an automobile.

21. The method of claim 19 where there is further present in the composition from 5 to 350 parts of filler.

22. The method of claim 1 wherein the filler is iron oxide.

23. The method of claim 21 wherein the filler is diatomaceous earth.

24. The method of claim 21 wherein there is further present a corrosion inhibitor at a concentration of 0.01 to 5 parts by weight per 100 parts of a base diorganopolysiloxane polymer selected from the class consisting of zinc powder, chromates, and mixtures thereof.

25. The method of claim 24 wherein the chromates are selected from the class consisting of $Zn_2 Cr_2O_4$, and $Ca_2 Cr_2O_4$ and mixtures thereof.

26. The method of claim 25 where there is further present from 0.01 to 1 part by weight anti-settling agent which is hydrogenated castor oil.

27. The method of claim 26 wherein the metal salt of a carboxylic acid is a tin salt of a carboxylic acid.

28. The method of claim 19 wherein the room temperature silicone rubber composition is first dissolved in organic solvent such that the composition comprises 5 to 99% by weight of the solution and the coating is applied by coating the automotive underside with a layer of said solution and then allowing the solvent to evaporate.

29. The method of claim 28 wherein the organic solvent is selected from the class consisting of aromatic solvents, aliphatic hydrocarbon solvents, ketone solvents, ester solvents and chlorinated aliphatic hydrocarbon solvents.

30. The method of claim 29 wherein there is further present from 0.01 to 10 parts by weight of a self-bonding additive of the formula, $$(R^2O)_{3-a}\,Si\,R^3_6\,\ominus$$

where $R^2$ and $R^3$ are monovalent hydrocarbon radicals, a varies from 0 to 2 and $\theta$ is a nitrogen-functional radical which is saturated, unsaturated or aromatic hydrocarbon residue which in addition to nitrogen functionality may be functionalyzed by a radical selected from the class consisting of amino, cyano, thio, OxO, and ester.

31. The method of claim 30 wherein the self-bonding additive has the formula, $$(R^2O)_{3-a}\,Si\,R^3\,CH_2\,CH_2\,CH_2\,NH_2$$

where $R^2$ $R^3$ and a is as previously defined.

32. The method of claim 19 wherein the silanol end-stopped diorganopolysiloxane has the formula, $$HO\!-\!\!\left[\begin{array}{c}R^4\\|\\Si\!-\!O\\|\\R^5\end{array}\right]_{\!t}\!\!-\!H$$

$R^4$ and $R^5$ are monovalent hydrocarbon radicals and t varies such that the diorganopolysiloxane polymer has a viscosity varying from 100 to 500,000 centipoise at 25° C.

33. The method of claim 19 wherein before the layer of the room temperature vulcanizable silicone rubber composition is applied, there is applied to said underside of vehicle a layer of silicone primer and a solvent and the solvent is allowed to evaporate from the primer and then there is applied there over the layer of the room temperature vulcanizable silicone rubber composition.

34. The method of claim 32 wherein the silicone primer composition is a reaction product of a silicone resin composed of monoorgano trifunctional siloxy units and diorgano difunctional siloxy units where the organo to Si ratio varies from 1.88 to 1.98 where the organo groups are alkyl radicals of 1 to 8 carbon atoms with a condensed silicate of the formula, $$R^8_b\,Si(OR^7)_{3-b}$$

where $R^7$, $R^8$ are monovalent hydrocarbon radicals and b is 0 to 1 dissolved in an organic solvent.

35. The method of claim 34 wherein the condensed silicate is ethyl silicate and the organic solvent is a mixture of an aliphatic alcohol and a ketone.

36. The underside of a metal automotive having a thin coating of silicone elastomer therein so as to retard the corrosion of said automotive part characterized in the improvement where the part is coated with a layer comprising a room temperature vulcanizable silicone rubber composition having (A) 100 parts of silanol end-stopped diorganopolysiloxane polymer with a viscosity varying from 100 to 500,000 centipoise at 25° C. where organo group is a monovalent hydrocarbon radical; (B) from 0.1 to 15 parts by weight of an alkyl silicate of the formula, $$R_a Si(OR^1)_{4-a}$$

and partial hydrolysis products of the silicate where R and $R^1$ are monovalent hydrocarbon radicals, a is 0 or 1 and (C) from 0.01 to 5 parts by weight of an effective metal salt of a carboxylic acid.

37. The underside of a metal vehicle coated with silicone elastomeric composition so as to retard the corrosion of the underside of the vehicle characterizing the improvement wherein the underside of the said vehicle part is coated with a thin layer of a room temperature vulcanizable silicone rubber composition comprising (A) 100 parts of a silanol end-stopped diorganopolysiloxane polymer with a viscosity varying from 100 to 500,000 centipoise at 25° C. where organo group is a monovalent hydrocarbon radical; (B) from 0.1 to 15 parts by weight of an alkyl silicate of the formula, $$R_a Si(OR^1)_{4-a}$$

and partial hydrolysis products of the silicate where R and $R^1$ are monovalent hydrocarbon radicals, a is 0 or 1 and (C) from 0.01 to 5 parts by weight of an effective metal salt of a carboxylic acid.

38. A method as in claim 1 or claim 19 wherein said metal salt of carboxic acid is selected from the group of metals consisting of lead, tin, zirconium, antimony, iron, cadmium, barium, calcium, titanium, bismuth, and manganese.

39. An article of manufacture as in claims 36 or 37 wherein said metal salt of carboxylic acid is selected from the group of metals consisting of lead, tin, zirconium, antimony, iron, cadmium, barium, calcium, titanium, bismuth, and manganese.

* * * * *